United States Patent

Hamm et al.

[11] Patent Number: 5,812,382
[45] Date of Patent: Sep. 22, 1998

[54] ELECTRICAL DEVICE WITH A TRANSFORMER WHOSE PRIMARY IS SUPPLIED UNDER THE CONTROL OF A CHOPPER

[75] Inventors: Valéry Hamm, La Fleche; Yves Mulet-Marquis, La Meignanne, both of France

[73] Assignee: Lacme, La Garenne, France

[21] Appl. No.: 698,682

[22] Filed: Aug. 27, 1996

[30] Foreign Application Priority Data

Sep. 1, 1995 [FR] France .................................. 95 10318

[51] Int. Cl.⁶ .......................... H02M 3/335; H02M 3/24
[52] U.S. Cl. ................................ 363/20; 363/21; 363/95
[58] Field of Search ............................. 363/20, 21, 95, 363/78, 40, 131

[56] References Cited

U.S. PATENT DOCUMENTS

| 5,146,394 | 9/1992 | Ishii et al. ................................ 363/16 |
| 5,267,133 | 11/1993 | Motomura et al. ........................ 363/21 |
| 5,278,748 | 1/1994 | Kitajima .................................... 363/21 |
| 5,394,017 | 2/1995 | Catano et al. ............................. 363/21 |
| 5,430,633 | 7/1995 | Smith ......................................... 363/20 |
| 5,434,768 | 7/1995 | Jitaru et al. ............................... 363/21 |
| 5,438,501 | 8/1995 | Margaritis et al. ....................... 363/24 |
| 5,608,613 | 3/1997 | Jansen ....................................... 363/21 |

FOREIGN PATENT DOCUMENTS

| 0 404 191 | 12/1990 | European Pat. Off. . |
| 57-162966 | 10/1982 | Japan . |
| 60-148374 | 5/1985 | Japan .......................... H02M 3/28 |
| 3-173351 | 7/1991 | Japan . |
| 5-038070 | 2/1993 | Japan . |

Primary Examiner—Peter S. Wong
Assistant Examiner—Bao Q. Vu
Attorney, Agent, or Firm—Young & Thompson

[57] ABSTRACT

An electrical device for use with a transformer whose primary 2 is supplied under the control of a transistor acting as a high frequency chopper, and from which the secondary delivers a low voltage of continuous shape under control of a first diode 5. In parallel with the primary 2, are arranged a diode 9 and a condenser 10. In parallel with the diode 9 are arranged a resistance 11, a transistor 12 and a diode 13. The leakage inductance energy of the primary 2 is stored in the condenser 10 and recovered in the primary 2 for use in the secondary.

7 Claims, 1 Drawing Sheet

ELECTRICAL DEVICE WITH A TRANSFORMER WHOSE PRIMARY IS SUPPLIED UNDER THE CONTROL OF A CHOPPER

BACKGROUND OF THE INVENTION

The invention relates to an electrical device with a transformer whose primary is supplied under the control of a chopper.

Such devices are generally used in battery chargers, or charger-starters. They comprise a transformer whose primary is supplied by continuous voltage or rectified alternating, and a secondary which delivers a current by means of a diode. The primary of the transformer is preferably under the control of a transistor which ensures chopping the supply voltage, at a high frequency of the order of 40 kHz. The transformer thus operates according to the so-called "flyback" technique of charging by storage.

In the case of a battery charger or a charger-starter, the supply voltage of the primary is in general the circuit voltage, rectified, whose maximum value is of the order of 300 V. In the secondary, the voltage is of the order of 12 to 15 V. The number of turns of the secondary is thus much less than the primary, and the leakage inductance of the primary is in general relatively high.

In the course of operation of a transformer according to the storage charge technique, the energy stored in the leakage inductance of the primary is dissipated either in the chopping transistor or in a component such as a levelling diode mounted for example in parallel with the transistor. There results either an overvoltage or an abnormal overheating, adapted to damage the transistor and to modify its operation.

SUMMARY OF THE INVENTION

An object of the present invention is to provide an electric device with a transformer not having this drawback and moreover using a portion of this energy instead of losing it.

The invention has for its object an electrical device with a transformer whose primary is supplied under the control of a transistor acting as a high frequency chopper, and of which the secondary delivers a low voltage of continuous shape under control of a first diode, characterized in that it comprises a circuit comprising a condenser mounted in parallel with the primary of the transformer, and in that this circuit recovers a portion of the energy of inductance leakage of the primary by means of the condenser to utilize it in the secondary of the transformer.

According to other characteristics of the invention:
said circuit comprises in parallel with the transformer primary, a second diode and a condenser; and in parallel with said second diode, a resistance, a second transistor and a third diode; the second diode ensuring the charging of the condenser by the current flowing in the primary after blocking said transistor; the third diode, the second transistor and the resistance ensuring the discharge of the condenser via the primary of the transformer after cancelling the current in said primary.
the resistance is determined such that the discharge of the condenser into the primary of the transformer will be aperiodic.
the transformer is continuously supplied.
the transformer is supplied alternatingly rectified with two alternances.

The invention also has for its object the use of an electrical device with a transformer defined above for the provision:

of a stabilized supply of direct current,
of a battery charger for automotive vehicles,
of a charger-starter for automotive vehicles.

BRIEF DESCRIPTION OF THE DRAWINGS

Other characteristics will become apparent from the description which follows, given with reference to the accompanying drawing, in which.

DESCRIPTION OF PREFERRED EMBODIMENTS

Figure 1:
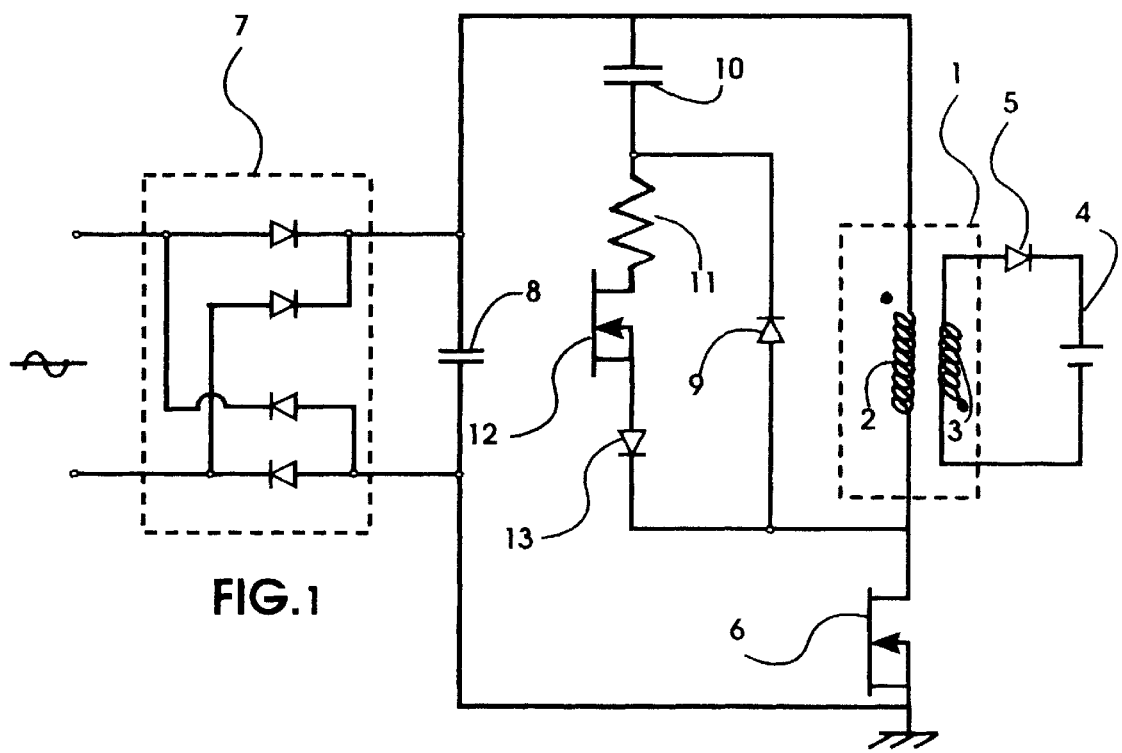
FIG. 1 is an electrical diagram of an embodiment of the electrical device with a transformer whose primary is supplied under the control of a chopper, according to the present invention.

In FIG. 1, the transformer 1 comprises a primary 2 and a secondary 3 which supplies the battery 4 to be charged by means of a diode 5. The primary 2 of the transformer 1 is controlled by a transistor 6. The assembly of the primary 2 and of the transistor 6 is supplied via the mains (220 V, 50 Hz) by means of a rectifying bridge 7 with two paths. At the outlet of the rectifying bridge 7, a condenser 8 is provided, not to filter the low frequency of the mains and smooth the curve of the rectified voltage, but to filter the high frequency (of the order of 40 kHz) of chopping imposed by the transistor 6 and to avoid sending electromagnetic disturbances through the circuit. The operation of the transformer 1 is controlled by the transistor 6 which ensures chopping of the supply voltage of the primary 2, at a high frequency, of the order of 40 kHz. During the conductive period of the transistor 6, the current in the primary 2 increases linearly. For a fixed duration of conduction of the transistor 6, the current reaches a value proportional to the instantaneous value of the supply voltage of the primary 2. This phase corresponds to the rising section of the curve Ip(t) in FIG. 2. During the conductive phase of the transistor 6, no current passes through the secondary 3 because of the respective direction of the primary and secondary flows and the presence of the diode 5.

Figure 2:
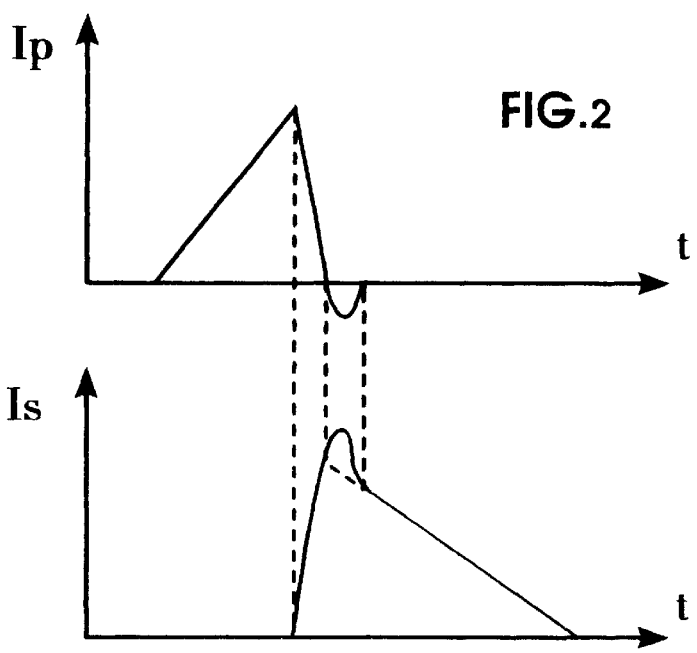
FIG. 2 shows the primary and secondary currents in the course of a sequence of operation of the transformer.

When the transistor 6 is blocked, the current in the primary drops rapidly according to the descending part of the curve Ip(t) in FIG. 2, and the current in the secondary increases rapidly according to the rising portion of the curve Is(t) in FIG. 2. Then, the current in the secondary decreases substantially linearly according to the descending portion of the curve Is(t) in FIG. 2, along the dotted line and then along the full line.

To recover a portion of the energy stored in the leakage inductance of the primary 2, the invention provides the mounting in parallel with the primary 2 of a second diode 9 and of a condenser 10, and in parallel with the diode 9, of a resistance 11, of a second transistor 12, and of a third diode 13.

The second diode 9 leads from the common point to the primary 2 and to the transistor 6 toward the condenser 10, such that during blockage of the transistor 6, the current in the primary 2 charges the condenser 10.

The third diode 13 serves to permit the discharge of the condenser 10 through the resistance 11 under the control of the second transistor 12.

The operation of the device is the following beginning with a conductive phase of the transistor 6. At the instant of blockage of the transistor 6, the second transistor 12 becomes conductive. The current passing through the primary 2, because of the presence of the leakage inductance, passes via the second diode 9 and charges the condenser 10. To the extent the current in the primary 2 decreases, the condenser 10 is charged and the current in the secondary 3 increases. The third diode 13 prevents the passage of a current in the secondary transistor 12.

When the current in the primary is cancelled, the condenser 10 attains its maximum voltage, as does the transistor 6. The voltage at the terminals of the transistor 6 can therefore be controlled by means of the value selected for the capacitance of the condenser 10.

The second transistor 12 being conductive, the third diode 13 permits the discharge of the condenser 10 through the resistance 11, the second transistor 12, the third diode 13 and the primary 2. The value of the resistance 11 is defined such that the discharge of the condenser 10 will be aperiodic. The discharge-current of the condenser 10 appears on the curve Ip(t) in FIG. 2 in the form of a negative impulse. A portion of the energy of the leakage inductance, which had been stored in the condenser 10 is then transferred to the secondary 3 of the transformer 1 instead of being dissipated in the transistor 6. The current in the secondary has an impulse corresponding to that of the primary current, which appears on the curve Is(t) of FIG. 2 above the dotted line.

The device according to the invention permits recovering a portion of the leakage inductance energy of the primary and utilizing it in the secondary 3 of the transformer 1, for the charging of a battery, or to assist in starting an automotive vehicle, for example. The device according to the invention can also be applied to the provision of a stabilized supply of direct voltage to the secondary of the transformer. It can be supplied direct or rectified alternating at two alternances.

What is claimed is:

1. In an electrical device with a transformer whose primary is supplied under the control of a transistor operating as a high frequency chopper, and whose secondary delivers a low voltage of continuous shape under the control of a first diode, a circuit comprising a second diode (9) and a condenser (10) being mounted in parallel with the primary (2) of the transformer (1), recovering a portion of the leakage inductance energy of the primary (2) by means of the condenser (10) to utilize it in the secondary (3) of the transformer (1); the improvement comprising:

in parallel with said second diode (9), a resistance (11), a second transistor (12) and a third diode (13), the second diode (9) ensuring the charging of the condenser (10) by the current flowing in the primary (2) after blockage of said transistor (6), and the third diode (13), the second transistor (12) and the resistance (11) ensuring the discharge of the condenser (10) through the primary (2) of the transformer (1) after cancelling the current in said primary (2), whereby a portion of the leakage inductance energy of the primary (2) is recovered by means of the condenser (10) and utilized in the secondary (3) of the transformer (1).

2. Device according to claim 1, wherein the resistance (11) is determined such that the discharge of the condenser (10) in the primary (2) of the transformer will be aperiodic.

3. Device according to claim 1, wherein the transformer (1) is supplied with a continuous voltage.

4. Device according to claim 1, wherein the transformer (1) is supplied with a rectified alternating current.

5. The device according to claim 1 for the provision of stabilized supply of direct current.

6. The device according to claim 1 for the provision of a battery charger for an automotive vehicle.

7. The device according to claim 1 for the provision of a charger-starter for an automotive vehicle.

* * * * *